March 12, 1957 C. W. KEUFFEL ET AL 2,784,641
ALIGNMENT TELESCOPE
Filed June 20, 1952 2 Sheets-Sheet 1
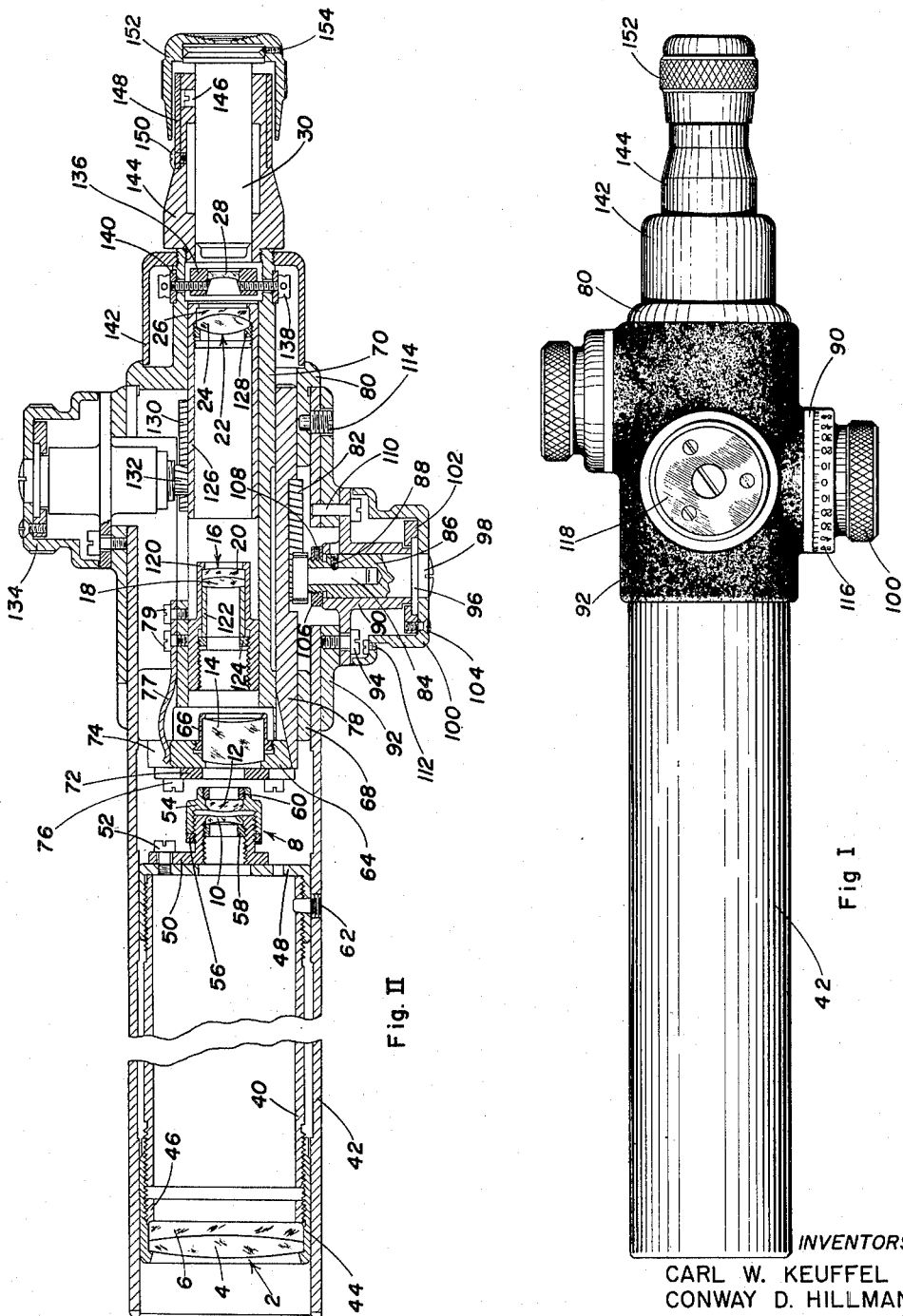
INVENTORS
CARL W. KEUFFEL
CONWAY D. HILLMAN
ALLISTER L. BAKER
BY 
ATTORNEY

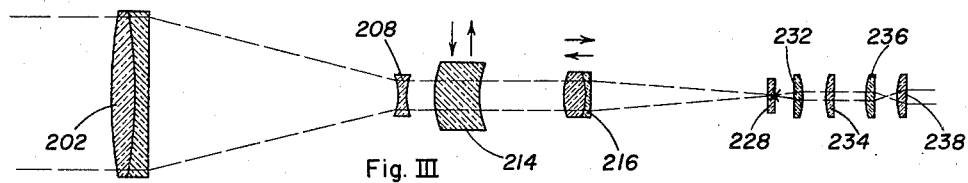
Fig. III
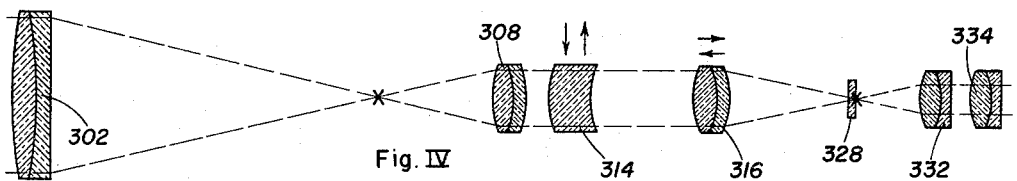
Fig. IV
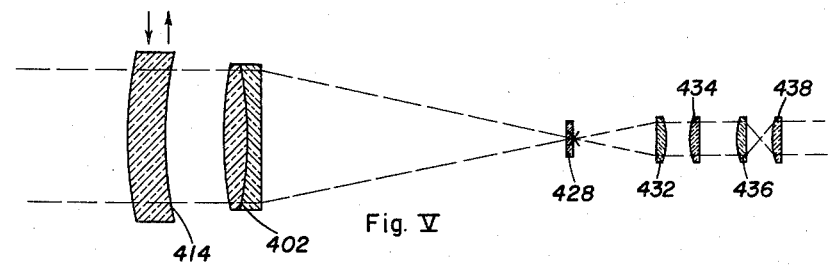
Fig. V
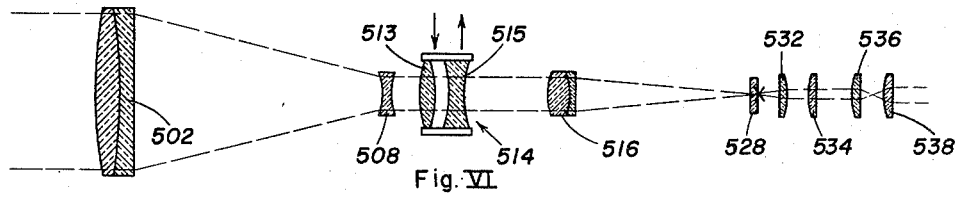
Fig. VI
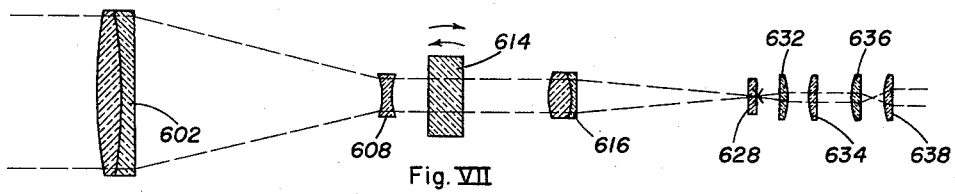
Fig. VII
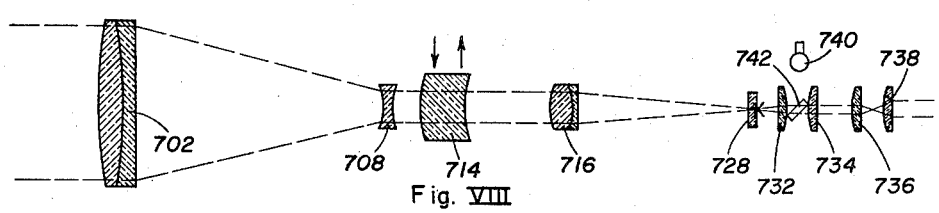
Fig. VIII
INVENTORS
CARL W. KEUFFEL
CONWAY D. HILLMAN
ALLISTER. L. BAKER
ATTORNEY

United States Patent Office 2,784,641
Patented Mar. 12, 1957

2,784,641

ALIGNMENT TELESCOPE

Carl W. Keuffel, Bernardsville, Conway D. Hillman, Millburn, and Allister L. Baker, Denville, N. J., assignors to Keuffel & Esser Company, Hoboken, N. J., a corporation of New Jersey Application June 20, 1952, Serial No. 294,652

10 Claims. (Cl. 88—32)

This invention relates to an optical instrument of the telescope class. More particularly it relates to a telescope suitable for optical alignment work. Instruments of this general type have recently been used quite extensively in the aircraft industry for lining up the component parts in the assembly of an aircraft. Some of these prior art instruments have micrometer means for measuring the vertical and horizontal displacements necessary to line up a particular target with the optical line of sight of the instrument. However in these instruments, the micrometer means have been provided outside the telescope objective which has made the instruments complicated in the structure for operating the micrometer means.

The principal object of the present invention is to provide a telescope for alignment work which includes optical micrometer means within the telescope for measuring the displacement necessary to line up a particular target with the optical line of sight of the instrument.

Another object of the present invention is to provide optical micrometer means for a telescope, which means operates by translation of an optical element laterally transversely across the optical line of sight of the telescope.

Another object of the invention is to provide optical micrometer means for a telescope which produces a displacement directly proportional to the movement of the displacement means.

Another object of the present invention is to provide a telescope which includes optical micrometer means and which can focus from infinity to a point very close to the objective of the instrument.

These and other objects of the invention and the means for their attainment will be more fully understood by reference to the following description taken in connection with the accompanying drawing in which:

Fig. I is a view in plan of the new optical instrument.

Fig. II is a broken view in enlarged sectional plan taken through the center line of Fig. I.

Fig. III is a diagrammatic view showing an optical arrangement for another embodiment of the invention.

Fig. IV is a diagrammatic view showing an optical arrangement for a third embodiment of the invention.

Fig. V is a diagrammatic view showing an optical arrangement for a fourth embodiment of the invention.

Fig. VI is a diagrammatic view showing an optical arrangement for a fifth embodiment of the invention.

Fig. VII is a diagrammatic view showing an optical arrangement for a sixth embodiment of the invention.

Fig. VIII is a diagrammatic view showing an optical arrangement for a seventh embodiment of the invention.

The optical parts of the first embodiment of the new telescope are shown in Fig. II. They consist of a positive objective lens 2, made up of a positive component 4 of crown glass and a negative component 6 of flint glass (the usual achromatic doublet combination); a negative lens 8, made up of a negative component 10 of crown glass and a positive component 12 of flint glass (also an achromatic doublet combination); a shifting lens 14, preferably of high index glass, a positive lens 16, made up of a positive component 18 of crown glass and a negative component 20 of flint glass (an achromatic cemented doublet combination); the positive lens 16 is considered to be the second objective lens of the instrument since parallel rays entering the first objective lens 2 will also enter the second objective lens 16 as parallel rays, a positive focussing lens 22, made up of a positive component 24 of crown glass and a negative component 26 of flint glass (an achromatic cemented doublet combination); a reticle 28 which may have a curved surface to correct the position of the exit pupil and a four lens erecting eyepiece 30, the individual lenses of which are not shown in Fig. II.

The spacing between the objective 2 and the negative lens 8 is such that the second principal focus of the objective 2 will coincide with the first principal focus of the negative lens 8. Thus parallel rays entering the objective lens 2 will leave the negative lens 8 as parallel rays. The second principal focus of a lens (whether positive or negative) is considered to be the point of convergence or divergence after refraction of parallel rays coming from the direction of the object or target. Conversely, the first principal focus of a positive or negative lens is the point of convergence or divergence after refraction of parallel rays coming from the opposite direction.

The shifting lens 14 is the equivalent of a Galilean telescope; i. e. its radii of curvature $R_1$ and $R_2$ and its thickness $t$ satisfy the formula:

$$R_1 + R_2 = \frac{t(n-1)}{n}$$

where $n$ is the index of refraction of the lens with respect to air. The radii of all convex surfaces are considered positive and the radii of all concave surfaces are considered negative. A glass of high index of refraction is preferably chosen for this component in order to keep the thickness low for the amount of displacement which must be accomplished in shifting the lens. The transverse or lateral shifting of the element 14 is understood to be a translational movement in the direction perpendicular to the optical line of sight of the instrument. If $d$ is the displacement caused by a transverse lateral shift $S$ of the shifting lens 14, then:

$$\frac{d}{s} = \frac{R_1 + R_2}{R_2}$$

In terms of the thickness and refractive index:

$$\frac{d}{s} = \frac{t(n-1)}{nR_2}$$

For a given displacement and any assumed $R_2$, a higher index of refraction, $n$, means that a thinner lens is required. When, as in Fig. II, the shifting lens 14 is internal, the equivalent of the displacement $d$ at the target will be the quantity calculated from the above formulae multiplied by the magnification of that part of the optical system which comes in front of the lens 14, in this case the combination of the objective lens 2 and the negative lens 8. If $m$ is the magnification of this combination and $D$ is the displacement at the target, then, the equations:

$$D = mS\left(\frac{R_1 + R_2}{R_2}\right) = mS\left(\frac{t(n-1)}{nR_2}\right)$$

should be satisfied.

The shifting lens 14 may be used as shown with the convex surface toward the objective end of the telescope or it may be used with the concave surface toward the objective end of the telescope. It is preferred to place the convex surface toward the objective end because in this position the shifting lens 14 will tend to increase the magnification of the telescope whereas in the other position it will tend to decrease the magnification. However, in this embodiment, the effect of the shifting lens 14 on the magnification will usually be small.

The positive lens 16 tends to bring the light passing through the shifting lens 14 to focus on the reticle 28. In the embodiment of Fig. II, the positive focussing lens 22 is required to actually bring the light to a focus. It would also be possible to focus the positive lens 16 itself in which case the focussing lens 22 would not be required or a negative focussing lens could be used. However, a positive focussing lens is preferred because it permits the instrument to be focussed down to a very close near distance. In fact with this type of construction it is possible to design a system which can focus right down to the front surface of the objective.

The four lens eyepiece within the tube 30 may be of the type commonly used in surveying instruments or any other suitable eyepiece may be used. The overall magnification of the telescope, M, will be given by the formula:

$$M = m m_s \frac{f_p}{f_e}$$

where $$m_s \text{ equals} \frac{R_1}{R_2}$$

which equals the magnification of the shifting lens, $f_p$ is the equivalent focal length of the combination of the positive lens 16 and the focussing lens 22 and $f_e$ is the equivalent focal length of the eyepiece.

The objective 2 and the negative lens 8 are carried by the tube 40 within the main tube 42. The objective 2 fits within the objective mount 44 and is held therein by the threaded ring 46. The objective mount 44 is threaded onto one end of the tube 40. This threaded connection may also be used for adjusting the spacing between the objective lens 2 and the negative lens 8. A mounting plate 48 is threaded onto the other end of the tube 40. The mount 50 for the negative component 10 of the negative lens 8 is held against the mounting plate 48 by three screws 52. Oversize holes may be provided in the mount 50 for the screws 52 to permit centering of the negative lens 8 with the objective lens 2. The mount 54 for the positive component 12 of the negative lens 8 screws over the mount 50 as shown. This threaded connection may also be used for the adjustment of the spacing between the negative element 10 and the positive element 12 of the negative lens 8. A locking ring 56 is provided to maintain this adjustment. Threaded rings 58 and 60 are also provided to hold the components 10 and 12 in their respective mounts 50 and 54. A set screw 62 is provided to hold the tube 40 in the main tube 42. A spherical surface which is centered with the optical axis may be provided on the main tube 42 as is known in the art to form part of a ball joint mounting for the telescope when in use.

The shifting lens 14 is carried in the transversely sliding mount 64 and held therein with a threaded ring 66. The transversely sliding mount 64 is held between the enlarged outer end 68 of the tube 70 and the plate 72. Three spacers 74 are provided between the plate 72 and the enlarged end 68 of the tube 70 and spacers 74 and plate 72 are held thereagainst by the screws 76. All of these parts are very accurately made to insure a close fit and smooth sliding action. The transversely sliding mount 64 is moved by means of the sliding wedge 78 which slides in a slot in the enlarged outer end of the tube 68 and a slot in the enlarged portion 80 of the tube 70. The action of the sliding wedge 78 is counteracted by the leaf spring 77 attached to the tube 70 by the screws 79.

A rack 82 is secured to the sliding wedge 78. The rack 82 is engaged by the pinion 84. The pinion 84 is held in the axle 86 by a set screw 88. The axle 86 fits in the bearing 90 which is provided with a flange that is secured to the casting 92 by the screws 94. The washer 96 is held onto the axle 86 by the screw 98. The knob 100 is clamped to the washer 96 by means of the ring 102 and the screws 104. The nut 106 which is secured by a set screw 108 holds the axle 86 in the bearing 90. A pin 110 passes through the casting 92 and the main tube 42 to prevent the casting 92 from turning or sliding on the tube 42. The head of the pin 110 may act as a stop limiting the turning of the knob 100. A screw or screws 112 may be provided inside the knob 100 to act against the pin 110 in limiting the motion of the knob 100. The enlarged portions 68 and 80 of the tube 70 fit accurately within the main tube 42 and the tube 70 is prevented from sliding and turning in the tube 42 by the set screw 114.

The knob 100 is provided with a graduated drum 116 (Fig. I). This graduated drum 116 cooperates with an index mark on the outer edge of the flange of the bearing 90. The index mark is preferably provided nearest the eyepiece end of the telescope for the convenience of the observer. Since the displacement at the target is proportional to the transverse movement of the shifting lens according to the formula given above, the scale on the graduated drum 116 is uniform. The angle $\theta$ in degrees which the drum 100 must be turned in order to compensate a displacement D at the target is given by the formula:

$$\theta = \frac{360 R_2 D}{m p \pi (R_1 + R_2) \tan \alpha}$$

where $p$ is the pitch diameter of the pinion 84 and $\alpha$ is the wedge angle of the sliding wedge 78. The graduation of the drum 116 is in accord with this formula.

The same type of construction may be used for moving the shifting lens 14 in the vertical direction and these means are operated by the knob 118 (Fig. I) which is also provided with a graduated drum not shown for indicating the vertical displacement at the target.

The positive lens 16 is held in the mount 120 by the tube 122 and the threaded ring 124. The mount 120 fits in the tube 70 and is held therein by a screw 79.

The positive focussing lens 22 is held in the tube 126 by the threaded ring 128. The tube 126 fits inside the tube 70 and is free to slide therein. A rack 130 is secured to the tube 126. The rack 130 also prevents turning of the tube 126 because it is limited by a slot in the tube 70. The rack 130 is operated by the pinion 132 which may be turned by means of the knob 134 in exactly the same manner as the pinion 84 is turned by means of the knob 100.

The reticle 28 is spun or cemented in the mount 136 which is supported near the eye end of the tube 70 by four adjusting screws 138. Washers 140 may be provided between the heads of the adjusting screws 138 and the tube 70. Pin holes are provided in the heads of the adjusting screws 138 to permit adjustment of the reticle 136 in both the horizontal and vertical directions. The cap 142 screws over the end of the tube 70 to cover the heads of the adjusting screws 138. The eyepiece bearing 144 screws into the end of the tube 70. The eyepiece tube 30 carrying the four eyepiece lenses slides within the eyepiece bearing 144. A screw 146 is attached to the side of the tube 30 and fits into a spiral slot in the eyepiece bearing 144. A sleeve 148 fits over the eyepiece bearing 144 to cover the spiral slot and is held in place by a screw 150. The knurled focussing ring 152 is secured to the tube 30 by set screw 154. The ring 152 turns the tube 30 for focussing the eyepiece on the reticle 28 by means of the spiral groove.

The optical system shown in Fig. III is essentially the same as the optical system shown in Fig. II except that the negative lens 208 is shown as a single component in Fig. III and no special focussing lens is provided. The second principal focus of the objective lens 202 coincides with the first principal focus of the negative lens 208 so that parallel rays entering the objective lens 202 will leave the negative lens 208 as parallel rays. The shifting lens 214 may be moved transversely by the means shown in Fig. II or any other suitable means. The positive lens 216 brings the rays to a focus on the reticle 228 and the lens 216 may be longitudinally adjustable for focussing the telescope on near objects. The eyepiece is made up of the four lenses 232, 234, 236 and 238, parallel rays entering the objective 202 coming to a focus between the third and fourth eyepiece lenses 236 and 238 and leaving the fourth eyepiece lens 238 as parallel rays.

In the embodiment of Fig. IV, the positive lens 308 is spaced from the objective 302 so that its first principal focus coincides with the second principal focus of the objective 302. Parallel rays entering the objective 302, leave the positive lens 308 as parallel rays. The shifting lens 314 lies between the positive lens 308 and the positive lens 316. The positive lens 316 focusses the rays on the reticle 328. In this case a two lens eyepiece made up of achromatic lenses 332 and 334 is used giving an erect image because of the focal plane between the objective lens 302 and the positive lens 308. The formulae given above apply to this embodiment, if $m$ is taken as the magnification of the combination of the objective lens 302 and the positive lens 308. It is possible to make the optical system of Figs. II or III shorter than the optical system of Fig. IV and Figs. II and III may be preferred for this reason.

The shifting lens has utility other than in the type of telescope illustrated in Fig. II. Fig. V shows a shifting lens 414 which is also a Galilean telescope used in front of the objective 402 of a simple erecting telescope. The objective 402 forms an image of a target on the reticle 428 which is viewed through the four lens erecting eyepiece made up of the lenses 432, 434, 436 and 438. In this embodiment, the displacement caused by the shifting lens is given directly by the formula:

$$d = \frac{S(R_1 + R_2)}{R_2}$$

In Fig. VI, the Galilean telescope shifting element 514 is made up of a positive lens 513 and a negative lens 515. The optical separation L of these two lenses is given by the formula:

$$L = f_1 + f_2$$

$f_1$ being the equivalent focal length of the first lens and $f_2$ being the equivalent focal length of the second lens. The shifting lens in the other embodiments may also be considered a Galilean telescope, the first surface having an equivalent focal length, $$f_1 = \frac{R_1}{n-1}$$

the second surface having an equivalent focal length, $$f_2 = \frac{R_2}{n-1}$$

and the optical separation L being related to the thickness of the lens by the formula, $L = t/n$. In all other respects, the embodiment of Fig. VI is the same as the embodiment of Fig. III. However, the Galilean telescope made up of two components may be used in other embodiments of the invention in the same manner as the shifting lens and may also be used with either the positive component or the negative component toward the objective end of the telescope.

The transversely or laterally shifting part of the instrument may also have greater magnification than that which would be obtained from the type indicated as elements 14, 214, 314, 414 and 514 in Figs. II–VI. For example, a telescope such as that made up by the positive lens 202 and the negative lens 208 in Fig. III or such as the telescope made up by the two positive lenses 302 and 308 in Fig. IV may be shifted laterally according to this invention. The shifting lenses 214 and 314 would then become unnecessary in Figs. III and IV and could be omitted.

The embodiment of Fig. VII is the same as the embodiment of Figs. III and VI except that a planoparallel tilting plate is used instead of a transversely shifting Galilean telescope. The planoparallel tilting plate is known in the art but until now its use has been limited to a position in front of the objective. The element 614 has flat planoparallel surfaces and operates by tilting about an axis whereas the Galilean telescopes 214 and 514 in Figs. III and VI operate by a transverse or lateral translational motion. The displacement caused by a planoparallel tilting plate is given by the formula:

$$d = \frac{t \sin(i-r)}{\cos r}$$

where $t$ is the thickness of the planoparallel plate, $i$ is the angle of tilt and $r$ is the angle of refraction corresponding to the angle $i$; i. e.:

$$\sin r = \frac{\sin i}{n}$$

It is evident that in this embodiment, the displacement is not proportional to the angle of tilt so a non-uniform scale must be used or some other special means such as a cam provided to compensate the nonproportional action.

The embodiment of Fig. VIII is the same as the embodiment of Fig. III except that illumination means are provided so that the telescope may be used as an autocollimator. For example, the illumination means may take the form of a lamp 740 and a partial reflector 742 (which may be merely a glass plate) for directing light through the reticle 728. Thus an image of the reticle 728 may be projected out through the objective 702 to suitable reflecting means which direct the light back to the objective 702 and through the rest of the optical system so that an image of the reticle is formed on the reticle. When the reticle is in coincidence with its image, the line of sight of the telescope is perpendicular to the reflecting means. In this manner, the instrument may be used for angular alignment as well as for transverse displacement alignment. The embodiments shown in the other figures may of course also be used for angular alignment if used in combination with a collimator.

Having thus described the invention, what is claimed is:

1. A telescope comprising an objective lens, a second lens within the telescope spaced from said objective lens at a distance so that its first principal focus will coincide with the second principal focus of the objective lens, a third lens within the telescope spaced further from said objective lens than said second lens, a reticle at a focal plane spaced further from said objective lens than said third lens, an eyepiece focussed on said reticle, a fourth lens adjacent one of said lenses having coincident principal foci but on the side thereof which coincides with the focus of the other lens, one of the surfaces of said fourth lens being convex and having a radius, $R_1$, the other of the surfaces of said fourth lens being concave and having a radius $R_2$, the axial thickness of said fourth lens being, $t$, the index of refraction with respect to air of said fourth lens being $n$, said quantities satisfying the relation, $$R_1 + R_2 = \frac{t(n-1)}{n}$$

in which the radius $R_2$ of the concave surface is a negative quantity, means for moving said fourth lens laterally to vary the displacement of the image of a given target, the displacement of the image being proportional to the lateral movement of said fourth lens and means for measuring the lateral movement of said fourth lens to make said reticle appear in alignment with the given target.

2. A telescope comprising an objective lens, a reticle at a focal plane of the telescope, an eyepiece focussed on said reticle, a second lens in front of said objective lens, one of the surfaces of said second lens being convex and having a radius, $R_1$, the other of the surfaces of said second lens being concave and having a radius, $R_2$, the axial thickness of said second lens being, $t$, the index of refraction with respect to air of said second lens being $n$, said quantities satisfying the relation, $$R_1+R_2=\frac{t(n-1)}{n}$$

in which the radius $R_2$ of the concave surface is a negative quantity, means for moving said second lens laterally to vary the displacement of the image of a given target the displacement of the image being proportional to the lateral movement of said second lens and means for measuring the lateral movement of said second lens to make said reticle appear in alignment with the given target.

3. A telescope comprising an objective lens, a second lens within the telescope spaced from said objective lens at a distance so that its first principal focus will coincide with the second principal focus of the objective lens, a third lens within the telescope spaced further from said objective lens than said second lens, a reticle at a focal plane spaced further from said objective lens than said third lens, an eyepiece focussed on said reticle, a fourth lens between said second and third lens, one of the surfaces of said fourth lens being convex and having a radius, $R_1$, the other of the surfaces of said fourth lens being concave and having a radius, $R_2$, the axial thickness of said fourth lens being $t$, the index of refraction with respect to air of said fourth lens being $n$, said quantities satisfying the relation $$R_1+R_2=\frac{t(n-1)}{n}$$

in which the radius $R_2$ of the concave surface is a negative quantity, means for moving said fourth lens laterally to vary the displacement of the image of a given target the displacement of the image being proportional to the lateral movement of said fourth lens and means for measuring the lateral movement of said fourth lens to make said reticle appear in alignment with the given target.

4. A telescope comprising an objective lens, a second lens within the telescope spaced from said objective lens at a distance so that its first principal focus will coincide with the second principal focus of the objective lens, a third lens within the telescope spaced further from said objective lens than said second lens, a reticle at a focal plane spaced further from said objective lens than said third lens, a focusing lens movable between said third lens and said reticle to bring a given target into focus on said reticle, an eyepiece focussed on said reticle, a fourth lens between said second and third lens, one of the surfaces of said fourth lens being convex and having a radius, $R_1$, the other of the surfaces of said fourth lens being concave and having a radius, $R_2$, the axial thickness of said fourth lens being $t$, the index of refraction with respect to air of said fourth lens being $n$, said quantities satisfying the relation $$R_1+R_2=\frac{t(n-1)}{n}$$

in which the radius $R_2$ of the concave surface is a negative quantity, means for moving said fourth lens laterally to vary the displacement of the image of a given target, the displacement of the image being proportional to the lateral movement of said fourth lens and means for measuring the lateral movement of said fourth lens to make said reticle appear in alignment with the given target.

5. A telescope comprising an objective lens, a negative lens within the telescope spaced from said objective lens at a distance so that its first principal focus will coincide with the second principal focus of the objective lens, a third lens within the telescope spaced further from said objective lens than said negative lens, a reticle at a focal plane spaced further from said objective lens than said third lens, an eyepiece focussed on said reticle, a fourth lens between said negative lens and third lens, one of the surfaces of said fourth lens being convex and having a radius, $R_1$, the other of the surfaces of said fourth lens being concave and having a radius, $R_2$, the axial thickness of said fourth lens being $t$, the index of refraction with respect to air of said fourth lens being $n$, said quantities satisfying the relation $$R_1+R_2=\frac{t(n-1)}{n}$$

in which the radius $R_2$ of the concave surface is a negative quantity, means for moving said fourth lens laterally to vary the displacement of the image of a given target, the displacement of the image being proportional to the lateral displacement of said fourth lens and means for measuring the lateral movement of said fourth lens to make said reticle appear in alignment with the given target.

6. A telescope comprising an objective lens, a negative lens within the telescope spaced from said objective lens at a distance so that its first principal focus will coincide with the second principal focus of the objective lens, a third lens within the telescope spaced further from said objective lens than said negative lens, a reticle at a focal plane spaced further from said objective lens than said third lens, an eyepiece focussed on said reticle, a focussing lens movable between said third lens and said reticle to bring a given target into focus on said reticle, a fourth lens between said negative lens and third lens, one of the surfaces of said fourth lens being convex and having a radius, $R_1$, the other of the surfaces of said fourth lens being concave and having a radius, $R_2$, the axial thickness of said fourth lens being $t$, the index of refraction with respect to air of said fourth lens being $n$, said quantities satisfying the relation $$R_1+R_2=\frac{t(n-1)}{n}$$

in which the radius $R_2$ of the concave surface is a negative quantity, means for moving said fourth lens laterally to vary the displacement of the image of a given target, the displacement of the image being proportional to the lateral movement of said fourth lens and means for measuring the lateral movement of said fourth lens to make said reticle appear in alignment with the given target.

7. A telescope comprising an objective lens, a positive lens within the telescope spaced from said objective at a distance so that its first principal focus will coincide with the second principal focus of the objective, a third lens within the telescope spaced further from said objective than said positive lens, a reticle at a focal plane spaced further from said objective lens than said third lens, an eyepiece focussed on said reticle, a fourth lens between said negative lens and third lens, one of the surfaces of said fourth lens being convex and having a radius, $R_1$, the other of the surfaces of said fourth lens being concave and having a radius, $R_2$, the axial thickness of said fourth lens being $t$, the index of refraction with respect to air of said fourth lens being $n$, said quantities satisfying the relation $$R_1+R_2=\frac{t(n-1)}{n}$$

in which the radius $R_2$ of the concave surface is a negative quantity, means for moving said fourth lens laterally to vary the displacement of the image of a given target, the displacement of the image being proportional to the lateral movement of said fourth lens and means for measuring the lateral movement of said fourth lens to make said reticle appear in alignment with the given target.

8. A telescope comprising an objective lens, a second lens within the telescope spaced from said objective lens at a distance so that its first principal focus will coincide with the second principal focus of the objective lens, a third lens within the telescope spaced further from said objective lens than said second lens, a reticle at a focal plane spaced further from said objective lens than said third lens, an eyepiece focussed on said reticle, a fourth lens adjacent one of said lenses having coincident principal foci but on the side thereof opposite the focus which coincides with the focus of the other lens, one of the surfaces of said fourth lens being convex and having a radius, $R_1$, the other of the surfaces of said fourth lens being concave and having a radius, $R_2$, the axial thickness of said fourth lens being $t$, the index of refraction with respect to air of said fourth lens being $n$, said quantities satisfying the relation $$R_1 + R_2 = \frac{t(n-1)}{n}$$

in which the radius $R_2$ of the concave surface is a negative quantity, means for moving said fourth lens laterally in each of two mutually perpendicular directions to vary the displacement of the image of a given target in the two mutually perpendicular directions, the displacement of the image in both directions being proportional to the lateral movement of said fourth lens and means for measuring the lateral movement of said fourth lens in each of said perpendicular directions necessary to make said reticle appear in alignment with the given target.

9. A telescope comprising an objective lens, a second lens within the telescope spaced from said objective lens at a distance so that its first principal foci will coincide with the second principal focus of the objective lens, a third lens within the telescope spaced further from said objective lens than said second lens, a reticle at a focal plane spaced further from said objective lens than said third lens, an eyepiece focussed on said reticle, a fourth lens adjacent one of said lenses having coincident principal foci but on the side thereof opposite the focus which coincides with the focus of the other lens, one of the surfaces of said fourth lens being convex and having a radius, $R_1$, the other of the surfaces of said fourth lens being concave and having a radius, $R_2$, the axial thickness of said fourth lens being $t$, the index of refraction with respect to air of said fourth lens being $n$, said quantities satisfying the relation $$R_1 + R_2 = \frac{t(n-1)}{n}$$

in which the radius $R_2$ of the concave surface is a negative quantity, a laterally slidable mount carrying said fourth lens, a longitudinally slidable member having an inclined surface engaging said laterally slidable mount, a rack on said longitudinally slidable member, a pinion engaging said rack and a drum turning with said pinion to move said fourth lens laterally to vary the displacement of the image of a given target, the displacement of the image being proportional to the lateral movement of said fourth lens, said drum having a scale for measuring the lateral movement necessary to make said reticle appear in alignment with the given target.

10. A telescope comprising an objective lens, a second lens within the telescope spaced from said objective lens at a distance so that it first principal focus will coincide with the second principal focus of the objective lens, a third lens within the telescope spaced further from said objective lens than said second lens, a reticle at a focal plane spaced further from said objective lens than said third lens, an eyepiece focussed on said reticle, a fourth lens adjacent one of said lenses having coincident principal foci but on the side thereof opposite the focus which coincides with the focus of the other lens, one of the surfaces of said fourth lens being convex and having a radius, $R_1$, the other of the surfaces of said fourth lens being concave and having a radius, $R_2$, the axial thickness of said fourth lens being $t$, the index of refraction with respect to air of said fourth lens being $n$, said quantities satisfying the relation $$R_1 + R_2 = \frac{t(n-1)}{n}$$

in which the radius $R_2$ of the concave surface is a negative quantity, a laterally slidable mount carrying said fourth lens, two longitudinally slidable members having inclined surfaces engaging said laterally slidable mount at right angles, a rack on each of said longitudinally slidable members, a pinion engaging each of said racks and a drum turning with each of said pinions to move said fourth lens laterally to vary the displacement of the image of a given target in each of two mutually perpendicular directions, the displacement of the image in both directions being proportional to the lateral movement of said fourth lens, said drums having scales for measuring the lateral movement in each of two mutually perpendicular directions necessary to make said reticle appear in alignment with the given target.

References Cited in the file of this patent

UNITED STATES PATENTS

| | | |
|---|---|---|
| 924,488 | Mustin | June 8, 1909 |
| 936,541 | Kellner | Oct. 12, 1909 |
| 1,196,811 | Rayton et al. | Sept. 5, 1916 |
| 1,270,545 | Nutting | June 25, 1918 |
| 1,445,284 | Bell et al. | Feb. 13, 1923 |
| 1,866,718 | Mihalyi | July 12, 1932 |
| 1,871,165 | Egy | Aug. 9, 1932 |
| 1,952,759 | Konig | Mar. 27, 1934 |
| 2,237,943 | Lihotzky | Apr. 8, 1941 |
| 2,336,330 | Wittel | Dec. 7, 1943 |
| 2,584,818 | Smith | Feb. 5, 1952 |
| 2,682,804 | Clifford et al. | July 6, 1954 |

FOREIGN PATENTS

| | | |
|---|---|---|
| 47,506 | Austria | Apr. 25, 1911 |
| 552,355 | France | Jan. 19, 1923 |
| 428,618 | Germany | May 10, 1926 |
| 394,285 | Great Britain | June 22, 1933 |
| 184,037 | Switzerland | Aug. 1, 1936 |